United States Patent [19]

Matthews et al.

[11] Patent Number: 4,652,987
[45] Date of Patent: Mar. 24, 1987

[54] REGULATOR WITH RECTIFIER IR DROP COMPENSATION

[75] Inventors: Lloyd E. Matthews, Berwyn; Philip J. Nowaczyk, Chicago, both of Ill.

[73] Assignee: Zenith Electronics Corporation, Glenview, Ill.

[21] Appl. No.: 809,988

[22] Filed: Dec. 17, 1985

[51] Int. Cl.$^4$ .................................... H02P 13/26
[52] U.S. Cl. ................................ 363/89; 363/53; 323/267
[58] Field of Search ............... 323/267, 271, 284; 363/67, 70, 89, 127, 50, 53; 361/18

[56] References Cited

U.S. PATENT DOCUMENTS

| | | | |
|---|---|---|---|
| 3,435,295 | 3/1969 | Ladd, Jr. et al. | 361/101 |
| 3,566,246 | 2/1971 | Seer, Jr. | 363/89 |
| 3,886,410 | 5/1975 | Seer, Jr. | 361/18 |
| 3,979,610 | 9/1976 | Gordon | 323/284 X |
| 4,017,789 | 4/1977 | Morris | 361/18 X |
| 4,439,819 | 3/1984 | Regan | 323/284 X |

Primary Examiner—Patrick R. Salce
Assistant Examiner—Marc S. Hoff

[57] ABSTRACT

A regulator for compensating for the IR drop of a rectifier coupled between the secondary winding of a transformer and a load circuit includes a pass transistor connected between the load circuit and the rectifier. A DC reference voltage is developed by a circuit connected across the secondary winding that is not subject to current fluctuations. A differential amplifier is supplied with the reference voltage as one input and the load voltage as another input. The output of the differential amplifier controls the conductivity of the pass transistor. A current limiting transistor is included in the base circuit of the pass transistor and, in turn, is controlled by another differential amplifier supplied with potentials representative of the IR drop across the rectifier. A shut down transistor is provided for cutting of the pass transistor in the event the load circuit voltage drops below a predetermined level.

8 Claims, 1 Drawing Figure

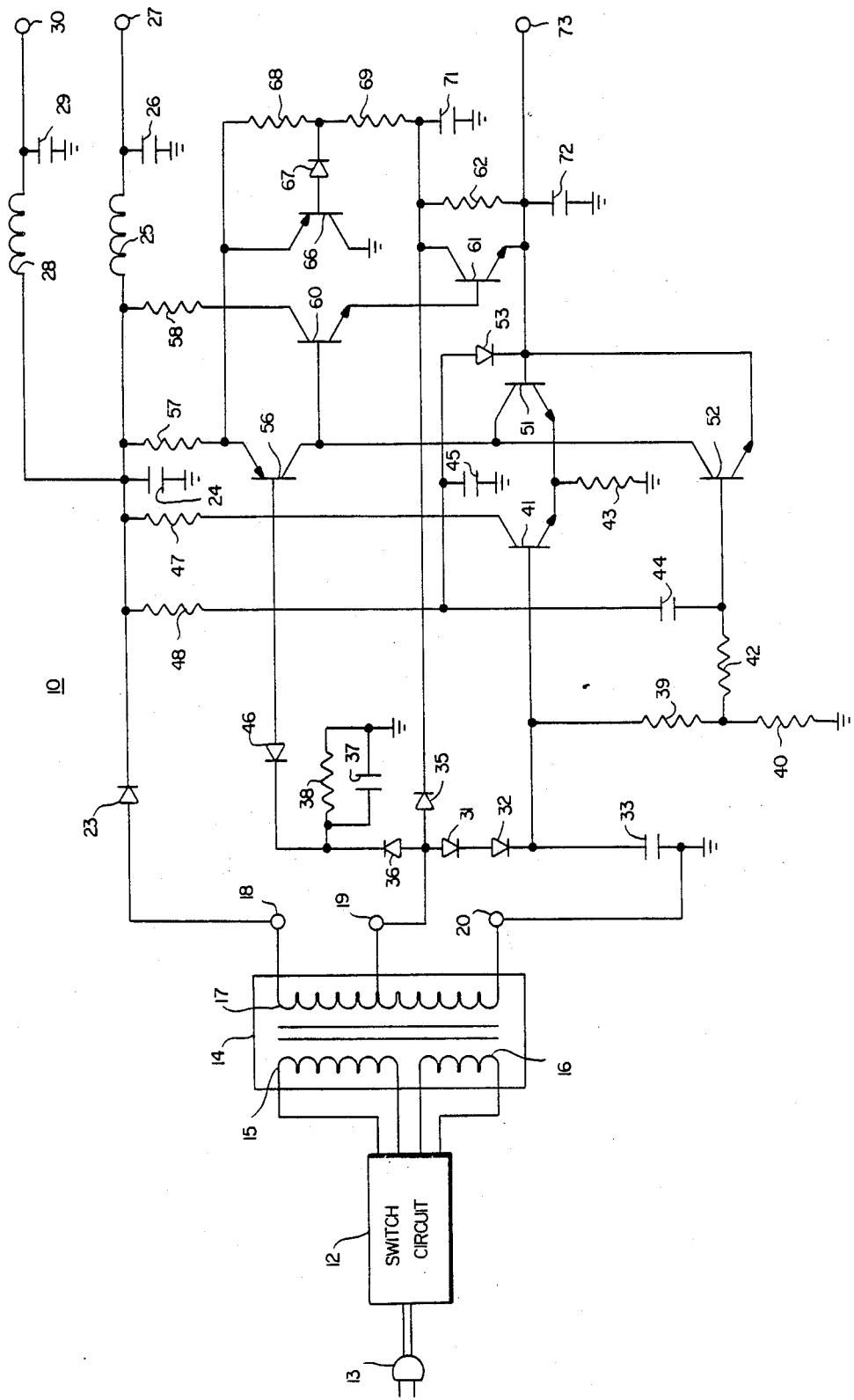

REGULATOR WITH RECTIFIER IR DROP COMPENSATION

BACKGROUND OF THE INVENTION

This invention relates generally to power supply voltage regulating circuits and specifically to regulating circuits used in connection with switch mode type power supplies.

It is well known in the art to compensate for voltage variations due to changes in current in a load supplied from the secondary winding of a transformer. This is generally accomplished by adjusting the voltage developed across the secondary winding to increase with an increase in load current and to decrease with a decrease in load current. So-called switch mode power supplies have recently become popular due to their favorable cost and operating efficiency. In some switch mode supplies, the current in a transformer primary winding is switched at a frequency ranging from 20 KHz to 70 KHz by a transistorized switching circuit to develop the secondary voltages.

Feedback regulation, that is, regulation that controls the voltage developed by the primary winding to compensate for changes in circuit load current, "bypasses" the transformer and poses safety problems. Circuits that employ primary winding regulation generally include an opto-coupler to avoid the possibility of the secondary winding of the transformer being exposed to primary winding voltage. Opto-couplers, however, not only have slow response times, but are relatively expensive. Also, regulation of the voltage across the primary winding of the power supply transformer changes the voltage across the entire secondary winding. Since it is common to have a number of different circuits independently supplied from the secondary winding, an increase in loading of one circuit will be compensated by changing a voltage that is applied to all circuits. Thus, a nominally operating circuit will be adversely affected by compensating for a circuit that experiences an increase or a decrease in loading. Typically, one or more 12 volt (12 V) load circuits may be supplied by a secondary winding along with a 5 volt (5 V) logic voltage load circuit. While the voltages to the 12 V load circuits may require some regulation, the 5 V logic voltage load circuit needs very close regulation. The 5 V logic voltage load circuit is also generally subject to a significant amount of load current variation. Consequently, if the 5 V supply to the logic load is controlled or regulated with reference to the voltage of the primary winding of the transformer, the 12 V load circuits will experience undesirable changes in operating potential. The converse is, of course, also true.

A different, though somewhat related, problem exists with switch mode power supplies. Generally, some form of current limiting protection for one or more of the secondary circuits is desired, usually the logic voltage load circuit. Thus the voltage supplying the 5 V logic circuit should not only be closely regulated to remain constant despite significant changes in load current, but also the regulator should be current limited to preclude damaging current flow in the circuitry in the event of a system or component fault.

The present invention solves both problems in a unique way. With the invention, the regulator output voltage is independently compensated for the IR drop in the regulator rectifier. Also, a current limiting circuit may be coupled to the output terminal to preclude current flow therefrom in excess of a predetermined amount.

OBJECTS OF THE INVENTION

A principal object of the invention is to provide an improved regulator.

Another object of the invention is to provide a regulator for regulating a second load circuit of a switch mode power supply.

A further object of the invention is to provide a switch mode power supply having a voltage-regulated and current-limited load circuit coupled to a secondary winding.

BRIEF DESCRIPTION OF THE DRAWING

Other objects and advantages of the invention will be apparent upon reading the following description in conjunction with the drawing, the single FIGURE of which depicts a schematic diagram of a regulated power supply constructed in accordance with the invention.

DESCRIPTION OF THE PREFERRED EMBODIMENT

Referring to the drawing, a regulated switch mode power supply 10 includes a switch circuit 12 that may be connected, by means of a plug 13, to a 110 V or 220 V source of AC line voltage. Switch circuit 12 may comprise any of a well known number of transistorized circuits for developing an oscillatory current in the primary windings 15 and 16 of a transformer 14. In a preferred embodiment, switch circuit 12 may include an AC to DC rectifier and a DC to AC converter with transformer 14 resonating in a frequency range from 20 KHz to 70 KHz. A secondary winding 17 on transformer 14 has a plurality of taps 18, 19 and 20, which may, by way of example, develop approximately 12 V AC between terminals 18 and 20 and 5 V AC between terminals 19 and 20. As illustrated, terminal 20 may be connected to ground. Tap 18 is connected to the anode of a first load rectifier 23, the cathode of which is coupled to a filter circuit having two branches, the first of which comprises a "pi" connected capacitor 24, choke 25 and capacitor 26 coupled to an output terminal 27 and the second of which comprises a "pi" connected capacitor 24, choke 28 and capacitor 29 coupled to an output terminal 30. Terminal 19 is connected to the anode of a second load rectifier 35, the cathode of which is connected to a lower voltage output terminal 73 by means of a resistor 62. A capacitor 72 is connected between terminal 73 and ground for filtering purposes. The circuit, as thus far described, is conventional with one DC output voltage being available at terminals 27 and 30 and a lower DC output voltage available at terminal 73. The voltage available at terminal 73 is generally on the order of 5 V and provides operating potential for logic circuitry connected thereto.

The rectifier arrangement has no overall feedback from the secondary side of transformer 14 to the primary side of the transformer. As mentioned, this is for safety considerations to preclude primary voltage from being inadvertently impressed upon the secondary side of the transformer. Also as mentioned, the currents flowing in the load circuits connected to terminals 27, 30 and 73 may vary independent of each other, that is, an increase in current flow through terminal 73, for example, may not be reflected in an increased current demand at the other terminals. In a very common and practical environment, terminal 73 is connected to logic circuitry that is subject to significant variations in load current and which ideally is supplied with a voltage that is held within very close tolerances. Thus, significant load currents flow through rectifier 35, which develops an IR voltage drop thereacross. While the IR drop may be on the order of a few tenths of a volt, it represents a significant undesirable voltage fluctuation at output terminal 73.

In accordance with the invention, the IR voltage drop across rectifier 35 is compensated by the provision of an NPN transistor 61 having resistor 62 connected in parallel with its collector-emitter conduction circuit and in series between rectifier 35 and output terminal 73. Transistor 61, which will be referred to as a "pass" transistor, is normally in conduction, with the degree of collector-emitter conduction being determined by the voltage developed at output terminal 73. A reference voltage V1 is established across terminals 19 and 20 of secondary winding 17 by a series circuit including a diode 31, a diode 32, a resistor 39 and a resistor 40. A capacitor 33 is coupled across resistors 39 and 40. Reference voltage V1 is developed at the junction of capacitor 33 and diode 32. Voltage V1 will be seen to be a constant since it is in a "fixed" circuit connected across secondary winding 17. Voltage V1 is supplied to the base of an NPN transistor 41 which, together with an NPN transistor 51, forms a differentially coupled pair having their emitters connected to ground through a resistor 43. The collector of transistor 41 is connected to rectifier 23 through a resistor 47. The collector of transistor 51 is connected to the collector of a PNP transistor 56, the emitter of which is connected to the cathode of diode 23 through a resistor 57. The collector of transistor 51 is also connected to the base of an NPN transistor 60. Transistor 60 has its emitter-collector path connected in series, with the base of pass transistor 61, from diode 23 through a resistor 58. The base of transistor 51 in the differentially coupled pair is connected directly to output terminal 73.

In operation, any change in voltage at output terminal 73 is reflected in the base voltage of transistor 51 and is compared with the reference voltage V1 at the base of transistor 41. Differences therebetween are reflected in the base voltage of transistor 60 which controls the conductivity of pass transistor 61. If the voltage at output terminal 73 decreases, the conductivity of pass transistor 61 is increased to restore the voltage. The decrease in voltage at terminal 73 will be recognized as being due to the IR drop across rectifier 35.

A current limit circuit is also provided to limit the current supplied to the load connected to output terminal 73. Another reference voltage V2 is developed at the junction of a diode 36 and a resistor 38 that are connected across terminals 19 and 20 of secondary winding 17. A filter capacitor is coupled in parallel with resistor 38. Reference voltage V2 is applied through a diode 46 to the base of a PNP transistor 56 which, together with a PNP transistor 66, forms another differentially coupled pair. The base of transistor 66 is supplied through a diode 67 connected to the junction of a pair of resistors 68 and 69. Resistors 68 and 69 are serially connected between resistor 57 and resistor 62 and form a voltage divider between diode 23 and output terminal 73. A capacitor 71 connects the junction of resistors 69 and 62 to ground. This junction is at the cathode of rectififer 35. Thus the voltage applied to the base of transistor 66 is compared to reference voltage V2. The compared voltages are seen to represent the IR drop across rectifier 35. If this IR drop exceeds a predetermined value determined by the divider resistors and the differential amplifier comprising transistors 56 and 66, current through transistor 56 is reduced, thus reducing the amount of current into the base of drive transistor 60 which is coupled to pass transistor 61.

An NPN shut down transistor 52 has its collector connected to the base of transistor 60, its emitter connected to the base of transistor 51 and its base connected to a resistor 42 that is coupled to the junction of resistors 39 and 40. Thus the base of transistor 52 is at a reference potential related to V1 and its emitter is coupled to output terminal 73. Transistor 52 is normally nonconductive. Should the potential at output terminal 73 fall as a result of current limiting of pass transistor 61, the emitter voltage of transistor 52 will be reduced and turn transistor 52 on. In turning on, transistor 52 completely cuts off the current to drive transistor 60 which cuts off pass transistor 61. The voltage at output terminal 73 drops to a low value determined by the load current and resistor 62. Should the excess loading abate within a short period of time, the output terminal voltage will rise and turn off transistor 52, to restore normal operation.

A delay circuit consisting of a resistor 48, a capacitor 44 and a diode 53 is incorporated to preclude shut down due to brief line interruptions or load current surges. The delay is due to the necessity of capacitor 44 discharging through resistor 42 before transistor 52 can turn on to cut off pass transistor 61.

What has been described is a novel regulator circuit that compensates for the IR drop in a rectifier without affecting the power supplied to other circuits, provides current limiting at the output load terminal and provides a current shut down circuit in the event of a sustained overload. It is recognized that numerous modifications and changes in the described embodiment of the invention will be apparent to those skilled in the art without departing from its true spirit and scope. The invention is to be limited only as defined in the claims.

What is claimed is:

1. A power supply comprising:
   a transformer including a primary winding and a secondary winding;
   a first and a second rectifier coupled to said secondary winding for supplying first and second load voltages for first and second load circuits, respectively;
   said first rectifier experiencing an IR drop thereacross that varies with changes in current supplied to said first load circuit; and
   compensation means for compensating for the effect of said IR drop on said first load voltage without substantially affecting said second load voltage.

2. The power supply of claim 1 wherein said compensation means include means coupled to said secondary winding for developing a reference voltage; and
   comparison means comparing the reference voltage with said first load voltage.

3. The power supply of claim 2 wherein said compensation means further include a pass transistor having an emitter-collector circuit coupled between said first rectifier and said first load circuit and wherein said comparison means apply a signal, representative of the difference between said reference voltage and said first load voltage, to said pass transistor.

4. The power supply of claim 3 wherein said comparison means comprise a differential amplifier having an output coupled to said pass transistor and having two inputs supplied with said reference voltage and said first load voltage, respectively.

5. The power supply of claim 4 further including current limiting means coupled to said pass transistor for controlling the load current flow therethrough as a function of the IR drop across said first rectifier.

6. The power supply of claim 5 wherein said current limiting means comprises a current limiting transistor, a further differential amplifier and means establishing a second reference voltage from said secondary winding, said further differential amplifier having a pair of inputs coupled across said first rectifier.

7. The power supply of claim 6 further incuding a shutdown circuit coupled to said current limiting transistor for disabling said pass transistor when said first load voltage falls below a predetermined level.

8. A switch mode power supply comprising:
   a transformer having a secondary winding coupled to a first load circuit terminal through a solid state rectifier and a pass transistor and to a second load circuit terminal through another rectifier;
   means establishing a DC reference voltage from said secondary winding; and
   a differential amplifier having a first input supplied with said reference voltage and a second input supplied with the voltage at said first load circuit terminal and an output coupled to said pass transistor;
   whereby variations in the voltage at said first load circuit terminal due to the IR drop in said solid state rectifier are compensated without substantially affecting the voltage developed by said secondary winding.

* * * * *